United States Patent [19]

Meeussen et al.

[11] 3,740,457

[45] June 19, 1973

[54] REPRODUCTION OF MULTICOLOUR SCENES AND PRINTS IN MULTICOLOUR TELEVISION

[75] Inventors: Louis Achilles Meeussen, Mortsel; Roger Joseph Huybrechts, Brussel, both of Belgium

[73] Assignee: Gevaert-Agfa N. V., Mortsel, Belgium

[22] Filed: Mar. 12, 1969

[21] Appl. No.: 806,447

[30] Foreign Application Priority Data

Mar. 13, 1968 Great Britain .................. 12,244/68

[52] U.S. Cl. ...... 178/5.4 CD, 178/5.2 A, 178/6.7 A

[51] Int. Cl. .......................... H04n 5/84, H04n 9/53

[58] Field of Search ..................... 178/6.7 A, 5.2 A, 178/5.4 CD

[56] References Cited

OTHER PUBLICATIONS

C. B. Neblette Photography, New York, D. Van Nostrand Co., Inc. TR 145N4 (1962) in Scientific Library pages 266, 478–487, 490.

E. M. Pittaro TU and Film Production Databook. New York, Morgan & Morgan, Inc. TR 880 P5 in Scientific Library C 1959 pages 146–151.

*Primary Examiner*—Howard W. Britton
*Attorney*—William J. Daniel

[57] ABSTRACT

A process of electronically reproducing for television transmittal by conventional reproduction and transmittal equipment multicolor photographic film which has an overall optical contrast or gamma within the range of 0.5–0.7 so that conventional electronic modification of the electronic signal can be omitted.

13 Claims, 3 Drawing Figures

REPRODUCTION OF MULTICOLOUR SCENES AND PRINTS IN MULTICOLOUR TELEVISION

Figure 1:
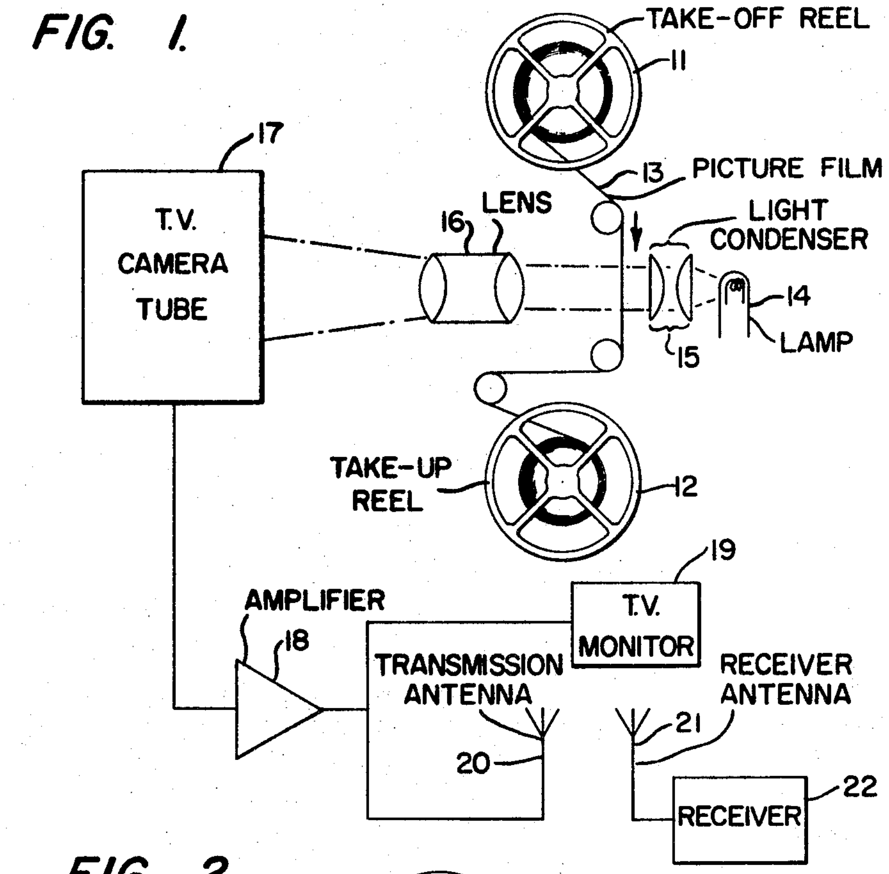

The invention relates to the production of multicolor images suited for use in color telecine-systems and reproduction on picture tubes of monitors and home receivers and to photographic materials suited for the production of such images.

The light-sensitive materials used in the production of positive color films are composed and processed to give images with a contrast factor (log Opacity difference/log Exposure difference) of from 1.0 to 2.0 in order that the film images shall be capable of cinema projection. When these color films are televised it is necessary for the telecine reproducer to modify the electronic signals obtained by scanning of the film in order that the pictures formed on the picture tubes of television receivers will be subjectively acceptable. This modification is necessary because the three-color picture tubes have the property of increasing the image contrast. The gradation characteristic (contrast factor) of the usual monitors and home-receiver image tubes is 2.2 or higher.

The present invention is based on the idea of making the necessary adjustments, to take account of the picture tube characteristics, at the stage of the color film production. This adjustment is achieved, according to the invention by recording the scenes or pictures to be telecasted on light-sensitive material composed and processed so that the photographic multicolor positive images are of uniquely low contrast. The permissible contrast, measured in terms of log opacity difference is between 1.00 and 1.35.

Films bearing multicolor positive images with a said low contrast value, unlike positive color films hitherto made, are not capable of giving satisfactory images by ordinary projection.

The invention is not only applicable in the production of multicolor positive films but also in the production of any multicolor positve record capable of being translated into video signals for transmission. In common telecine equipment pictures or scenes are recorded, e.g., by means of a flying spot scanner combined with a photo-tube or by means of a film projector combined with a "vidicon" or a "plumbicon" tube.

A multicolor image of low contrast according to the invention can be telecasted substantially without electrical gamma modification of the electronic signals obtained by scanning. The electronic correction unit (if present in the telecine equipment can be switched off or used only for fine adjustments about the gamma value 1.

It will be appreciated that use of the idea on which the invention is based necessitates the use of light-sensitive materials suitable for the production of images having a low gradation. The results in view can be achieved if the multicolor image of the color picture or scene to be telecasted is produced on light-sensitive material or blank film in such a way that it has a gamma value of from 0.45 to 0.7. The invention accordingly includes light-sensitive materials as such, capable of providing a multicolor image capable of being scanned and having a gamma value of from 0.45 to 0.7. Such materials include, e.g., negative multicolor recording materials, multicolor printing materials for use in printing color negatives, multicolor reversal materials for recording or printing, and processed materials having the above image gradation characteristics.

A light-sensitive material can be regarded as suitable if by normal exposure through a wedge followed by development a characteristic density versus log *I.t* (*I.t*= Exposure) curve can be obtained with a gamma value of from 0.45 to 0.7. By "normal" exposure we mean an exposure of the light-sensitive material so that there is no or substantially no over-exposure or under-exposure. A gamma value within the said range should preferably be obtainable by a normal development, in particular by using a developer of a composition which is normal for developing color images satisfactory for ordinary cinema projection, the development period being, e.g., 8 to 9 minutes and the developer temperature 20°C.

The image contrast of multicolor images to be telecasted, which images according to the invention have a gamma value of 0.45 to 0.70, ranges from 1.00 to 1.35, i.e., the average value is 1.175 plus or minus 0.175 assuming that the light-sensitive material is exposed to a scene or picture having a normal contrast. In general the subject contrast of normal scenes or pictures to be telecasted is not less than 40:1 (or 1.6 when expressed logarithmically).

The invention is particularly but not exclusively intended for application in the production and telecasting of motion picture film and in such film the characteristics hereinbefore specified may obtain in respect of the successive film images. Alternatively the mean characteristics of the successive images are as specified. Thus, the invention includes films and telecasting processes in which the successive motion picture film images show an average contrast within the range 1.0 to 1.35, and particularly such films and processes wherein the images record scenes or pictures of which the subject contrast or average subject contrast is at least 40:1.

There are of course various ways of producing multicolor positive photographic images. In some of these ways (some of which will hereafter be reviewed) a combination of light-sensitive materials is used, e.g., a combination of negative and positive materials or a combination of light-sensitive materials with an imbibition printing material. In such cases, the gamma value of from 0.45 to 0.7 of the image to be transmitted (if it is to apply) must be the overall gamma, i.e., the product of the gamma values of the individual photographic materials employed. Thus, when applying the negative-positive process the product of the gamma of the negative material and the positive material is called the overall-gamma.

The invention has advantages other than the fact that electronic gamma modification in the telecine equipment can be substantially dispensed with. In particular the invention makes it possible to telecast an integrally masked positive color film. In general, the telecine equipment can only register densities within the range 0.3 to 2.2. Assuming that a photographic image with a contrast of 1.17 is formed, this means that an integral mask with a density of $2.2 - 1.17 = 1.03$ can be present without exceeding the reproduction capacity of the telecine equipment. Another advantage attaching to the use of light-sensitive material of low contrast, is that there is a correspondingly greater exposure latitude and this of course is particularly important if it is desired to use non-masked reversal color film.

Certain ways of forming multicolor photographic images for telecasting will now be outlined :

According to a first embodiment multicolor images having a gradation within the aforesaid range of gamma values are obtained according to the negative-positive process by recording the color scenes on a negative multicolor silver halide recording material and printing the developed images on a positive multicolor silver halide printing material resulting in multicolor images with the required overall-gamma.

According to a second embodiment a positive multicolor image having an aforesaid gradation is obtained by recording a color scene on a silver halide multicolor reversal material the image contrast characteristic of which lies within the above-mentioned values.

According to a third embodiment a positive multicolor image having a gradation within the aforesaid range of overall-gamma values is obtained by printing a positive multicolor image on a suitable color reversal silver halide material.

According to a fourth embodiment an imbibition multicolor print having a gradation within the aforesaid range of overall-gamma values is obtained by imbibition printing on a blank film. In that embodiment use is made of positive matrixes having a gradation within the range of the gamma values cited above. In principle the imbibition color reproduction process, also known as "Technicolor process" is carried out using regular masked multicolor negatives. From these negatives, for each of the primary colors blue, green and red, positive matrixes are made on matrix films, which according to the present invention have to meet particular requirements regarding the gradation. The matrixes are dyed with subtractive dyes, which means that the "blue" positive matrix is dyed yellow; the "green" matrix is dyed magenta and the "red" matrix is dyed cyan. The dyes are then transferred to a mordanted blank film by applying the imbibition process wherein each of the dyed matrixes is placed one after the other in exact register into contact with the blank film.

Referring to the first embodiment it is preferred to use a negative recording material with a gamma of 0.65 in combination with a positive printing material with a gamma of 1.0. Applying such a combination, a gamma value of $0.65 \times 1.00 \times 2.20 = 1.40$ will result on the picture tube of the monitor or home receiver (assuming that the gradation characteristic of the tube is 2.2).

According to a preferred embodiment the exposure value (E) corresponding with the rectilinear part of the gradation curve of the image produced on the negative color material does not essentially differ from antilog 1.8 so that the image density range ($\Delta$ D of this material amounts to $1.8 \times 0.65 = 1.17$.

According to a preferred embodiment the exposure value (E) corresponding with the rectilinear part of the gradation curve of the image obtained on the positive color material (used as print material for the negative material), does not essentially differ from antilog 1.17 so that the image density range ($\Delta$ D) of this material amounts to $1.17 \times 1.00 = 1.17$.

The low density range (1.17) has the advantage that a signal with a very favorable signal/noise ratio in other words with low noise can be obtained.

Further, in view of the rather low image density range (1.17) of the positive color image and the rather extended density reproduction capacity (0.3 to 2.2) of the telecine recorder and the picture tube of monitor and home receiver it is possible to make use in the positive color image of a correction system for the unwanted side-absorptions of the color images, e.g. of the side absorptions in the blue of the magenta and in the blue and green of the cyan part images respectively. This is done by integral masking viz. by means of color mask images making integral part of the color material. In the integral masking the side-absorptions, e.g. the side-absorptions of the color images which are spectrally reproduced to the least accurate extent, e.g. the magenta and cyan part images, are compensated in the color material itself by color images of opposite gradation the dye(s) of which absorb(s) in the side-absorption region of the dyestuffs of these color part images.

The different ways for producing a mask image in the material containing the color image is described e.g. by Bernhard Morcher in Phototechnik und Wirtschaft, No. 8, 1966, p. 348–350 and in the U.S. Pat. Nos. 3,245,787 of Jozef Frans Willems and Jan Jaeken and 3,245,788 of Jan Jaeken and Robert Leopold Janssеune, both issued Apr. 12, 1966. The said references are to be read in conjunction with the present invention. The masking systems discussed in the mentioned periodical can be mainly divided into two systems viz. those using colored color couplers (see U.S. Pat. No. 2,449,966 of Wesley T. Hanson, Jr.) and systems with colorless color couplers and colorless mask forming compounds (see U.S. Pat. Nos. 3,245,787 and 3,245,788 cited above and United Kingdom Patent Specification 975,932 filed Nov. 13, 1959 by Gevaert Photo-Producten N.V. The formation of a mask image as described in the above mentioned patents occurs in principle in the same way for a negative color material as for a positive color material.

By means of the integral mask image the maximal densities in the green and blue light-absorbing parts respectively of the multicolor material are increased in proportion to the degree in which a defined side-absorption has to be compensated. The part contributed to the total absorption of the color image in the red (in general to be neglected in practice) green and blue by the mask images, at the above mentioned maximal image density (1.17) can reach $2.20 - 1.17 = 1.03$. This suffices since mask densities up to a value of 1.00 in the blue and 0.7 in the green range are already on the high side. Since in practice there is no mask density present in the red, there is still the possibility to obtain a signal with low noise for that primary color,which is most subjected to noise because of the lower sensitivity of photocells and tubes in that part of the spectrum.

It is self-evident that the explanation relating to the possibility of integral masking of the positive color printing material applies also to the color reversal materials mentioned in the description of the second and third embodiments.

For illustrating the present invention a detailed description is given hereinafter relating to an integrally masked silver halide color reversal material, which on image-wise exposure and reversal color development produces color images that are suited for recording in a telecine equipment and reproduction on a picture tube of monitor or home receiver without need for substantial electronic gamma-correction in the telecine equipment.

Figure 3:
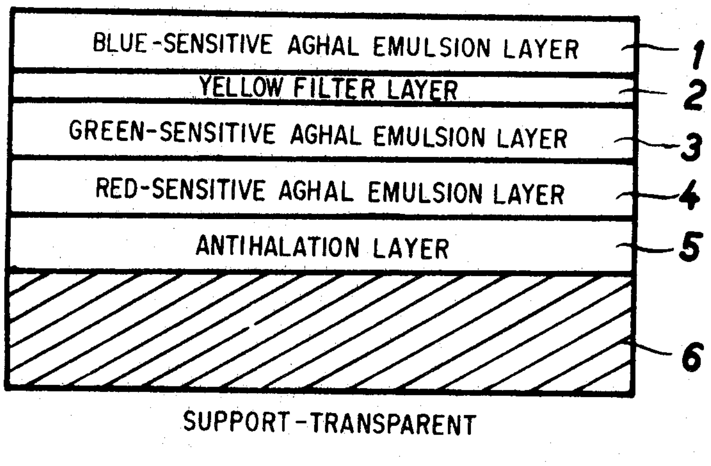

The composition of said material is depicted in FIG. 3 of the accompanying drawings, in which numeral 1 refers to a blue-sensitive silver halide emulsion layer with a colorless color coupler for yellow; numeral 2 refers to a yellow filter layer; numeral 3 refers to a green-sensitive silver halide emulsion layer with a colorless color coupler for magenta and a colorless mask forming compound for the formation of a yellow mask image; numeral 4 refers to a red-sensitive silver halide emulsion layer with a colorless color coupler for cyan and a colorless mask-forming compound for the formation of an orange mask image; numeral 5 refers to an antihalation layer, which is capable of being decolorized during the processing and numeral 6 to a transparent support such as a cellulose triacetate base.

In the composition of this color material use was made of a silver bromide iodide emulsion. The blue sensitive emulsion layer 1 contained per sq.m a quantity of 1.10 g of a color coupler for yellow corresponding to the following formula :

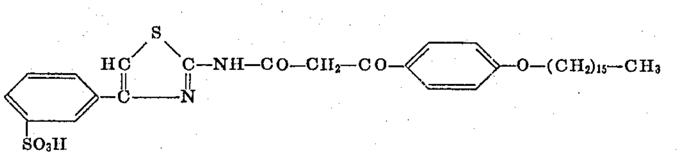

The green-sensitive emulsion layer 3 contained per sq.m a quantity of 0.59 g of a color coupler for magenta corresponding to the following formula :

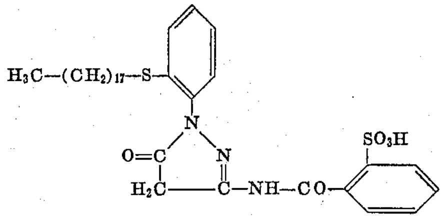

and a quantity of 0.50 g per sq.m of a mask-forming compound corresponding to the following formula :

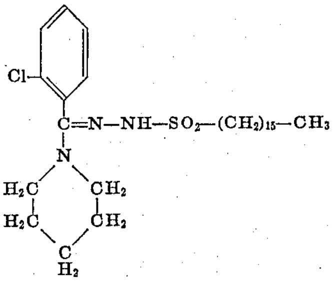

The red-sensitive emulsion layer 2 contained a quantity of 0.63 g per sq.m of a color coupler for cyan corresponding to the following formula :

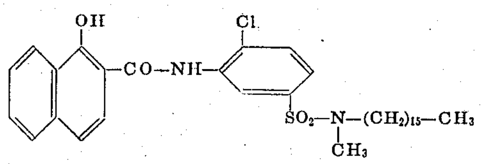

and a quantity of 0.45 g per sq.m of a mask-forming compound corresponding to the following formula :

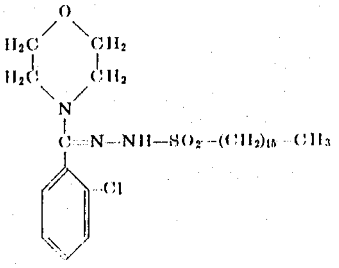

This material having a sensitivity of 18° DIN was exposed in a camera to a daylight scene under such conditions of exposure time and aperture size that there was no under-exposure of over-exposure.

The color reversal development was executed as follows :

First a black-and-white development in a black-and-white developer having the following composition :

| | |
|---|---|
| water | 800 ccs |
| sodium hexametaphosphate | 2 g |
| 1phenyl-3-pyrazolidone | 3 g |
| anhydrous sodium sulphite | 50 g |
| hydroquinone | 6 g |
| anhydrous sodium carbonate | 40 g |
| 50 % aqueous solution of potassium thiocyanate | 5 ccs |
| potassium bromide | 2 g |
| water to make | 1 liter. |

Then the material was rinsed and treated in a stop bath having the following composition :

| | |
|---|---|
| water | 900 ccs |
| potassium alum | 15 g |
| glacial acetic acid | 10 ccs |
| borax | 21 g |
| water to make | 1000 ccs |

The material was then thoroughly washed and reexposed and treated in the following color developer for 7 min. at 25°C.

| | |
|---|---|
| water | 900 ccs |
| sodium hexametaphosphate | 1 g |
| anhydrous sodium sulphite | 4 g |
| hydroxylamine | 0.3 g |
| p-diethylamino-phenylene ammonium chloride | 2.7 g |
| anhydrous sodium carbonate | 25 g |
| potassium bromide | 2.2 g |
| sodium bicarbonate | 0.55 g |
| water to make | 1 liter |

After having rinsed the material for 5 min. it was treated for 3 min. in the following fixing composition :

| | |
|---|---|
| water | 800 ccs |
| anhydrous sodium thiosulphate | 200 g |

| | |
|---|---|
| sodium bisulphite | 12 g |
| glacial acetic acid | 12 ccs |
| borax | 20 g |
| potassium alum | 15 g |
| water to make | 1 liter |

The material was washed again for 3 min. and then treated for 3 min. in a bleach bath having the following composition :

| | |
|---|---|
| potassium hexacyanoferrate (III) | 100 g |
| potassium bromide | 15 g |
| borax | 20 g |
| magnesium sulphate | 50 g |
| water to make | 1 liter |
| | (pH = 8.6) |

The material was then washed for 3 min. and again treated for 3 min. in the above fixing bath, whereupon it was once again washed for 5 min.

A masked multicolor positive of the recorded color scene is obtained, wherein the color part images have a maximal optical density of 1.20 and a gamma value of 0.50. The thus produced multicolor image is suited for correct contrast-reproduction of the original color scene by means of a telecine reproducer, television emitter and common home television receiver tube.

Figure 2:
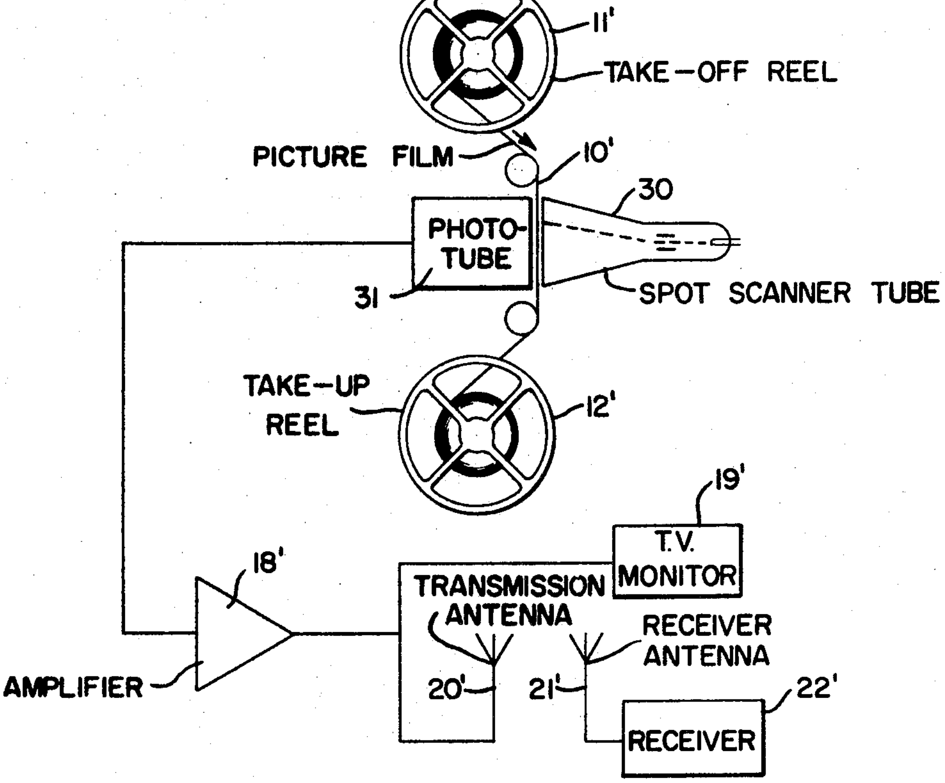

FIG. 1 is a diagrammatic view of a system for carrying out the invention using a film projector combined with a "vidicon" or a "plumbicon" television camera tube; and FIG. 2 is a similar diagrammatic view of a different system using a flying spot scanner combined with a phototube.

In FIG. 1, the numeral 11 represents a take-off reel holding motion picture film 13 which is delivered to a take-up reel 12. The film advanced between the two reels is projected by means of a projection lamp 14, a light condensor 15 and a projection lens 16 onto the face of a television camera tube 17 which can be of the conventional vidicon or plumbicon types. The television tube transforms the optical image received on its face into a line-wise built-up sequence of corresponding electronic signals that are fed to an amplifier 18 and, after such amplification, transmitted either by wire to a television monitor receiver 19 or, alternatively, transmitted by signal-wise modulated electromagnetic wave emission from an antenna 20 to the receiving antenna 21 for delivery to a home television receiver 22.

In FIG. 2, the motion picture film 10', while advancing between the reels 11' and 12', is scanned by a flying spot scanner tube 30 in which an electronic beam strikes a fluorescent screen producing a light spot scanning the image frames of the film. The light spot thus produced is received by a phototube 31 that transforms the optical signals of the image-wise modulated light spot into electronic signals. These signals, as in the system of FIG. 1, are amplified in an amplifier 18' and transmitted either to a monitor set 19' or transmitted antenna-wise with the transmission antenna 20' and the receiving antenna 21' to the home receiver set 22'.

We claim :

1. A process of television transmission which comprises the steps of: (1) photographically reproducing the original scene to be televised by means of multicolor photographic film to give positive multicolor photographic images of said scene having an overall optical contrast within the range of 0.45–0.7 gamma value, (2) converting said positive multicolor photographic images in said multicolor photographic film into an electronic signal having an intensity generally corresponding to the optical contrast of the various areas of said image, (3) amplifying the electronic signals thus produced, and (4) transmitting said signals for reception and translation into a visible picture by a television receiver, said signals being converted and amplified without electronic modification of the relative intensities thereof.

2. A process according to claim 1, wherein the optical contrast of said photographic images, measured in terms of log opacity difference, is within the range 1.0 to 1.35.

3. A process according to claim 1, wherein said multicolor image records a scene of which the subject contrast is not less than 40:1.

4. A process according to claim 1, wherein the said multicolor image is produced by recording the desired scene on a negative silver halide multicolor recording material and printing the negative record on a positive silver halide multicolor printing material, the negative and positive materials yielding an image having an overall gamma value between 0.45 and 0.70.

5. A process according to claim 1 wherein the said multicolor image is produced by recording the scene on a silver halide multicolor reversal material having color-sensitive layers yielding images having an overall gamma value between 0.45 and 0.70.

6. A process according to claim 1, wherein the said multicolor image is produced by printing a positive multicolor picture on a silver halide multicolor reversal material, said image having an overall gamma value between 0.45 and 0.70.

7. A process according to claim 1, wherein the said multicolor image is produced by an imbibition printing process in such a way that the image has an overall gamma between 0.45 and 0.70.

8. A process according to claim 1 wherein said film is a motion picture film formed of a series of frames each carrying a multicolor photographic image thereon.

9. The process of claim 1, wherein said photographic images are converted into electronic signals by optically projecting the film carrying the images on a television camera tube.

10. The process of claim 1 wherein said photographic images are converted into electronic signals by optically scanning the film carrying said images with a flying spot scanner and receiving the light signal thus produced on a phototube.

11. A process according to claim 1, wherein the said multicolor image is produced in a light-sensitive color material in which at least one mask image is formed.

12. A process according to claim 11, wherein each such mask image is or produced by a colored color coupler system.

13. A process according to claim 11, wherein the said multicolor image comprises integrally masked cyan and magenta color part images, the masks having been formed from colorless color couplers and colorless mask formers.

* * * * *